(12) United States Patent
Cohen et al.

(10) Patent No.: US 7,669,522 B2
(45) Date of Patent: *Mar. 2, 2010

(54) COOKING APPLIANCES AND FOOD HOLDERS PARTICULARLY USEFUL THEREIN

(75) Inventors: Eli Cohen, Lev HaSharon (IL); Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 774 days.

This patent is subject to a terminal disclaimer.

(21) Appl. No.: 11/329,064

(22) Filed: Jan. 11, 2006

(65) Prior Publication Data

US 2007/0157823 A1 Jul. 12, 2007

(51) Int. Cl.
*A47J 37/00* (2006.01)

(52) U.S. Cl. .............................. 99/375; 99/349; 99/372

(58) Field of Classification Search ........... 99/327–333, 99/349–351, 348, 372–379, 444–450; 219/521–525; 426/523, 520

See application file for complete search history.

(56) References Cited

U.S. PATENT DOCUMENTS

| D155,422 | S | 10/1949 | Henderson |
|---|---|---|---|
| 2,719,903 | A | 10/1955 | Oertli |
| 3,352,227 | A | 11/1967 | Litman |
| 3,524,404 | A | 8/1970 | Kimura et al. |
| 4,002,112 | A | 1/1977 | Snyder |
| 4,011,431 | A | 3/1977 | Levin |
| 4,091,720 | A | 5/1978 | Wheeler |
| 4,150,609 | A | 4/1979 | McClean |
| D253,218 | S | 10/1979 | Johnson |
| 4,206,345 | A | 6/1980 | Maass et al. |
| 4,601,237 | A * | 7/1986 | Harter et al. .................. 99/349 |
| 4,627,335 | A * | 12/1986 | Sherman et al. ............... 99/325 |
| 4,664,025 | A | 5/1987 | Martinez |
| D299,609 | S | 1/1989 | Madl |
| 4,852,545 | A * | 8/1989 | Sherman et al. ........... 126/39 H |
| D309,844 | S | 8/1990 | Storsberg |
| 5,129,313 | A | 7/1992 | Coppier |
| 5,181,455 | A | 1/1993 | Masel et al. |

(Continued)

FOREIGN PATENT DOCUMENTS

EP 1020153 7/2000

(Continued)

OTHER PUBLICATIONS

OA of Aug. 14, 2008.

(Continued)

*Primary Examiner*—Timothy F. Simone

(57) ABSTRACT

A cooking appliance, includes a pair of cooking plates pivotally mounted to various angular positions, including a vertical position. Each plate is formed, centrally of its lower edge in the vertical position of the two plates, with a ribbed formation defining a drain channel for draining from the plates fluids emanating from the food article during the cooking thereof between the plates. A disposable food holder is provided including a pair of panels of heat-resistant sheet material joined to each other to define a compartment for holding the food article during the cooking thereof, the compartment having a small drain opening aligned with the drain channel of the cooking plates for draining fluids emanating from the food article.

18 Claims, 3 Drawing Sheets

U.S. PATENT DOCUMENTS

| | | | |
|---|---|---|---|
| D334,108 S | 3/1993 | Fisher | |
| D347,548 S | 6/1994 | Bochm et al. | |
| D364,992 S | 12/1995 | Wooderson et al. | |
| 5,606,905 A | 3/1997 | Boehm et al. | |
| 5,755,150 A * | 5/1998 | Matsumoto et al. | 99/334 |
| 5,791,234 A * | 8/1998 | Newton et al. | 99/349 |
| D411,937 S | 7/1999 | Siegler et al. | |
| 5,970,851 A | 10/1999 | Masel et al. | |
| 6,003,436 A | 12/1999 | Masel et al. | |
| 6,012,380 A | 1/2000 | Hermansson | |
| 6,016,741 A | 1/2000 | Tsai et al. | |
| D419,823 S | 2/2000 | Choi | |
| 6,109,169 A | 8/2000 | Masel et al. | |
| 6,192,788 B1 | 2/2001 | Benedictus et al. | |
| 6,321,639 B1 | 11/2001 | Misceo | |
| D456,666 S | 5/2002 | Monguilod | |
| 6,397,730 B1 * | 6/2002 | Steinbach et al. | 99/331 |
| 6,439,108 B1 * | 8/2002 | Wu | 99/349 |
| D467,766 S | 12/2002 | Wanat et al. | |
| 6,555,795 B2 | 4/2003 | Glucksman et al. | |
| 6,595,116 B1 * | 7/2003 | Lin | 99/349 |
| 6,782,804 B1 | 8/2004 | Lin | |
| 6,889,602 B2 | 5/2005 | Brady et al. | |
| D519,776 S | 5/2006 | Chen | |
| 7,109,442 B2 * | 9/2006 | Steinberg et al. | 219/386 |
| D543,410 S | 5/2007 | Cohen et al. | |
| 2004/0216730 A1 | 11/2004 | Sawhney et al. | |
| 2007/0186785 A1 | 8/2007 | Cohen et al. | |

FOREIGN PATENT DOCUMENTS

| | | |
|---|---|---|
| GB | D2024495 | 7/1992 |
| JP | 2008-093410 | 4/2008 |

OTHER PUBLICATIONS

Official Action Dated Mar. 9, 2009 From the US Patent and Trademark Office Re.: U.S. Appl. No. 11/135,331.

Notice of Allowance Dated Dec. 13, 2006 From the US Patent and Trademark Office Re.: U.S. Appl. No. 29/253,822.

Official Action Dated Jul. 2, 2008 From the US Patent and Trademark Office Re.: U.S. Appl. No. 11/580,119.

Official Action Dated Jun. 12, 2009 From the US Patent and Trademark Office Re.: U.S. Appl. No. 11/580,119.

Official Action Dated Jan. 29, 2009 From the US Patent and Trademark Office Re.: U.S. Appl. No. 11/580,119.

* cited by examiner

COOKING APPLIANCES AND FOOD HOLDERS PARTICULARLY USEFUL THEREIN

FIELD AND BACKGROUND OF THE INVENTION

The invention relates to food holders for holding a food article while being heated in a cooking device. The invention is particularly useful for holding meat products, such as steaks, hamburgers, and the like, in a grilling appliance, such as described in U.S. Pat. Nos. 6,003,436 and 6,109,169, and in U.S. patent application Ser. No. 11/135,331, filed May 24, 2005, the contents of which patents and patent application are incorporated herein by reference.

The above-cited US Patent Application describes a cooking appliance which includes a base for supporting the cooking appliance on a horizontal surface; and a pair of cooking plates pivotally mounted on the base to various angular positions including a vertical position with respect to the base. As described therein, such a grilling appliance permits food articles, particularly meat products, to be grilled in a very short period of time. Further details of the construction and operation of such a cooking appliance are set forth in the above-cited US Patent Application, whose contents are incorporated herein by reference.

While the invention is particularly useful as a food holder in a grilling appliance as described above, it will be appreciated that it could also be used in many other appliances, e.g., for holding vegetables to be steamed.

OBJECTS AND BRIEF SUMMARY OF THE PRESENT INVENTION

An object of the present invention is to provide a cooking appliance of the foregoing type with a food holder for holding the food article during the cooking thereof. Another object of the present invention is to provide a food holder particularly useful in a cooking appliances of the type described in the above-cited US Patent Application. A further object of the invention is to provide a food holder for holding other types of food articles during the heating thereof, e.g., for holding vegetables during the steaming thereof.

According to one aspect of the present invention, there is provided a cooking appliance, comprising: a base for supporting the cooking appliance on a horizontal surface; two cooking plates each pivotally mounted on the base to various angular positions including a substantially vertical position wherein the two plates are disposed in a substantially parallel spaced relationship to each other for receiving therebetween the food article to be cooked, and with one of the edges of each plate, constituting the upper edges, located vertically above the edges at the opposite sides of the respective plate, constituting the lower edges; the cooking plates being formed centrally of the lower edges with a ribbed formation defining a drain channel for draining from the plates fluids emanating from the food article during the cooking thereof between the plates.

According to another aspect of the present invention, there is provided a food holder for holding a food article while being heated between heating plates in a cooking device, comprising: a pair of panels of heat-resistant material joined to each other at their side peripheral edges to define a compartment for holding the food article in a vertical position during the heating thereof; the peripheral edges of the panels defining the top of the compartment, in the vertical position of the compartment, being non-joined to each other to define a large opening for introducing and removing the food article with respect to the compartment; the peripheral edges of the panels defining the bottom of the compartment, in the vertical position of the compartment, being joined to each other except for a small section in which the panels are non-joined to define a small drain opening for draining fluids emanating from the food article during the heating thereof in the compartment; at least one of the panels including, at the non-joined section of the bottom of the compartment, an extension extending downwardly of the joined edges at said bottom such as to direct the fluids draining through the draining opening to a restricted dripping region underlying the drain opening.

In the described preferred embodiment, both panels include, at the non-joined section of the bottom of the compartment, an extension extending downwardly of the joined bottom edges and straddling the drain opening, such as to direct the fluids draining through the drain opening to the restricted dripping region underlying the drain opening.

As will be described more particularly below, the foregoing features of the invention are particularly useful in grilling appliances of the type described in the above-cited US Patent Application, or in vegetable steaming appliances, wherein they facilitate the rapid cooking of the food article products and the efficient draining of fluids emanating from such food products during the cooking thereof. In addition, the food holder maintains the grill plates relatively clean, thereby eliminating the need for cleaning after each use. Further, the food holder can be produced in volume and at low cost such as to enable disposal of the food holder after one-time use.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

The food holder of the present invention is particularly useful in a cooking appliance of the type briefly described above, and more particularly described in the above-cited U.S. patent application Ser. No. 11/135,331. The cooking appliance therein illustrated is a grilling appliance for use in grilling steaks, hamburgers, and the like in a quick and efficient manner.

Figure 1:
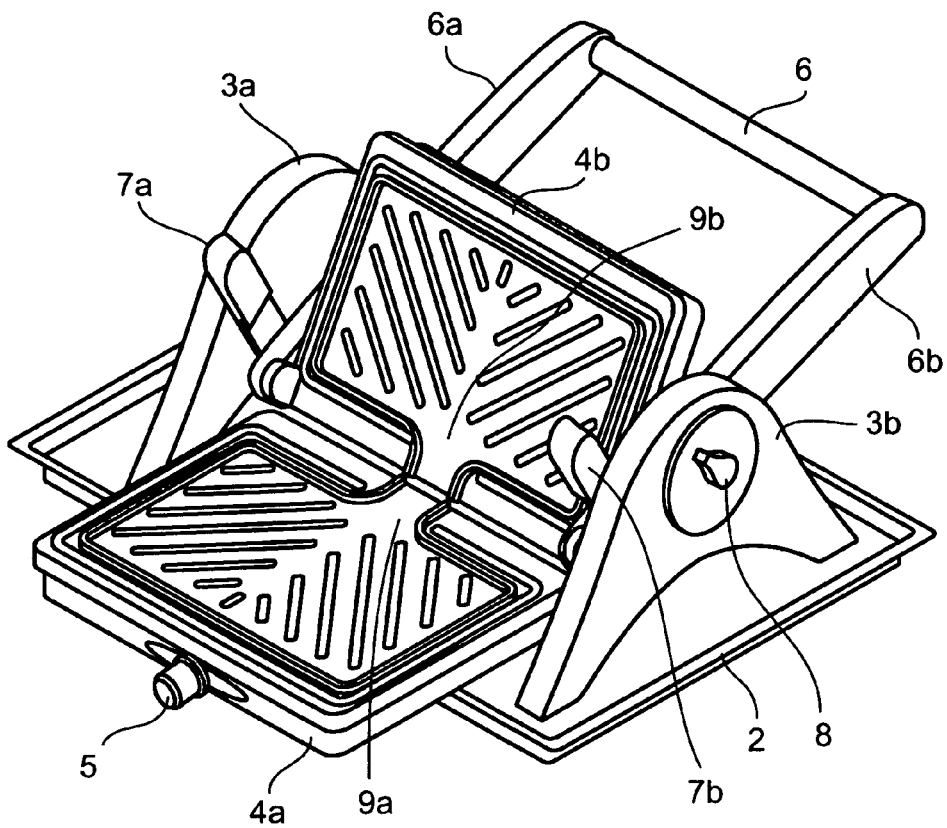
FIG. 1 is a three-dimensional view illustrating one form of cooking appliance constructed in accordance with the present invention.
Figure 5:
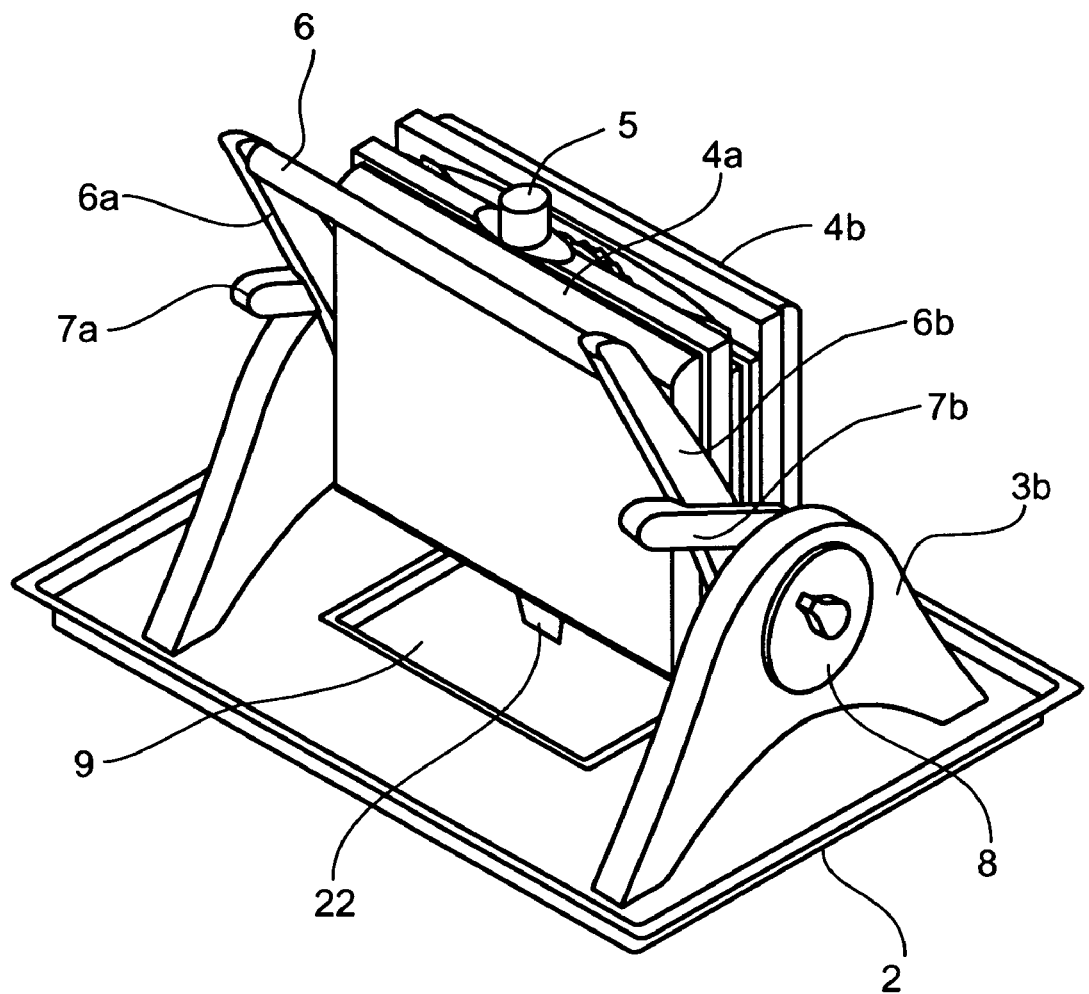
FIG. 5 illustrates the cooking appliance of FIG. 1 with its two cooking plates pivotted to a vertical position during the cooking of the food article received within the food holder.

The grilling appliance illustrated in the drawings includes a base 2 for supporting the appliance on a flat horizontal surface. Base 2 supports a frame including a pair of end legs 3a, 3b pivotally mounting a pair of electrically-heated plates 4a, 4b designed as grill plates, for receiving between them the steak, hamburger or other food article to be cooked. The two grill plates 4a, 4b are each pivotal to different angular positions with respect to each other and to base 2. FIG. 1 illustrates the two grill plates 4a, 4b in their open positions, wherein grill plate 4a is substantially horizontal, and grill plate 4b is in an open position for receiving the food article between them; FIG. 5 illustrates the two grill plates 4a, 4b in a closed position wherein both plates are substantially parallel to each other and extend vertically with respect to base 2.

The illustrated appliance further includes a finger knob 5 projecting outwardly from grill plate 4a, and a handle 6 projecting outwardly from grill plate 4b to facilitate moving the two grill plates to their open and closed positions, shown in FIGS. 1 and 5, respectively. The illustrated appliance further includes a pair of pivotal retainer arms 7a, 7b releasably engaging the arms 6a, 6b of handle 6 for retaining the grill plates in their closed positions, as illustrated in FIG. 5. One end leg 3b of the appliance carries a rotary knob 8 which, in one position, locks the two grill plates 4a, 4b in their respective positions, and in another rotary position, releases the two grill plates for pivoting to other positions.

As shown particularly in FIG. 1, the two grill plates 4a, 4b are provided centrally of their bottom edges with recesses 9a, 9b, to define a fluid outlet for conducting away fluids dripping from the food articles as they are cooked between the grill plates in the vertical position of the grill plates as shown in FIG. 5. A drip pan 9c, shown in FIG. 5, is removably supported in base 2 in alignment with the opening defined by recesses 9a, 9b to catch such drippings.

When using the appliance in the drawings for grilling steaks, hamburgers and the like food articles, the food article may be placed between the two grill plates 4a, 4b, for direct contact with them. It has been found, however, advantageous to use a disposable food holder, as shown at 10 in FIGS. 2-4, to hold the food articles when being cooked between the two grill plates 4a, 4b. The use of such a disposable food holder obviates the need for frequent cleaning of the grill plates.

Figure 2:
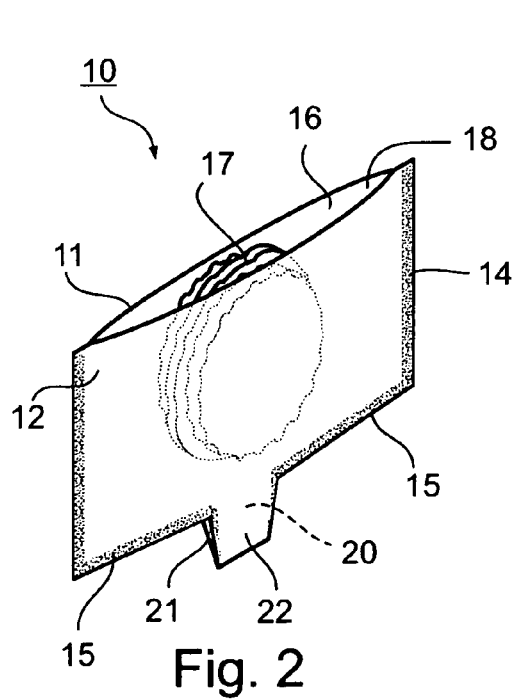
FIG. 2 illustrates the food holder particularly for use in the cooking appliance of FIG. 1.
Figure 4:
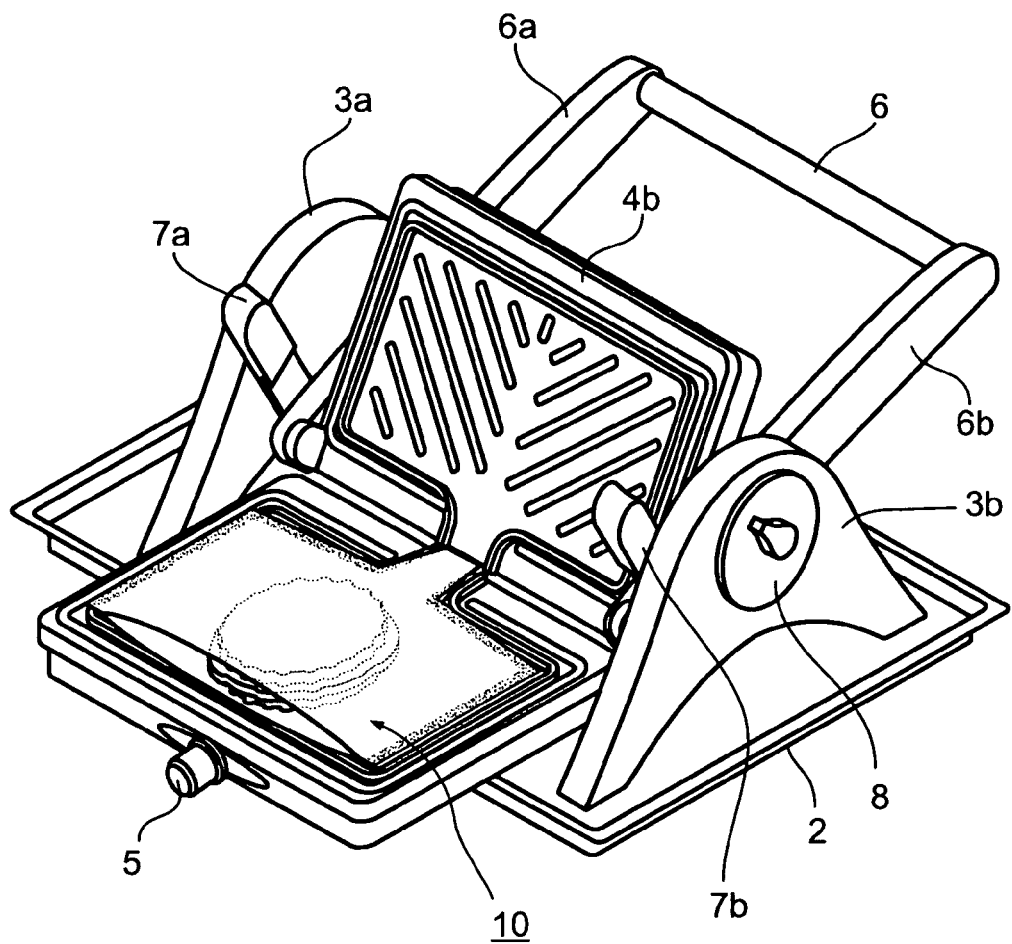
FIG. 4 illustrates the food holder of FIG. 2 introduced into the cooking appliance of FIG. 1.

The construction of food holder 10 is best seen in FIG. 2, and its placement between the two grill plates 4a, 4b is shown in FIG. 4.

Food holder 10 includes a pair of panels 11, 12 of a heat-resistant material joined to each other at their peripheral edges, including their opposed side edges 13, 14 and bottom edges 15, to define a compartment 16 for holding the food article 17 during its heating in the grilling appliance. The top peripheral edges of the two panels 11, 12 are not joined together, to thereby define a large opening 18 for introducing the food article 17 into compartment 16, and for removing it from the compartment.

As shown particularly in FIG. 2, the two panels 11, 12 are of substantially rectangular configuration. They are preferably made of a flexible, transparent, heat-resistant sheet material so as to enable viewing the food article 17 within it.

According to an important feature in food holder 10 illustrated in the drawings, the two panels 11, 12 are joined together at their bottom peripheral edges, as shown at 15 (FIG. 1) except for a small section, shown at 20, in which the two panels are not joined to each other. Unjoined section 20 thereby defines a small drain opening for draining fluids emanating from the food article 17 during its cooking within compartment 16. In the illustrated embodiment, each of the two panels 11, 12, is formed with an extension 21, 22, respectively, extending downwardly of the joined bottom edges 15 of the two panels and received within the two recesses 9a, 9b of the grill plates 4a, 4b. Extensions 21, 22 direct the fluid dripping from the food article through drain opening 20 to a restricted dripping region underlying the drain opening and occupied by the removable pan 9c (FIG. 5).

Thus, fluids dripping from the food article during its heating within food holder 10 drain to the bottom of compartment 15 towards drain opening 20, and are guided, by surface tension, along the inner faces of extensions 21, 22, outwardly of the food holder onto drip pan 9c. If desired, the lower peripheral edges of the two panels 11, 12, joined together as shown at 15 to define the bottom of compartment 14, may be slightly inclined so as to tend to converge towards drain opening 20, and thereby to enhance the draining effect. Extensions 21, 22 straddling drain opening 20 may also be inclined to direct the draining fluids to a small outlet for such fluids. Drain opening 20, including its guiding extensions 21, 22, is preferably located substantially centrally of the bottom of compartment 16.

The manner of using the illustrated grilling appliance will be apparent from the above description. Thus, when a food article, such as a steak or hamburger, is to be grilled, the food article is manually placed within compartment 16 of the disposable food holder 10. The appliance is then moved to its open position as illustrated in FIG. 1, wherein grill plate 4a is disposed substantially horizontally, and grill plate 4b is pivotted to its open position, to permit the introduction of food holder 10 holding the food article 17 to be grilled. The food holder is placed on the horizontal grill 4a such that the two extensions 21, 22, defining the drain opening 20, are located within recess 9a of grill plate 4a, and in alignment with recess 9b of grill plate 4b, as shown in FIG. 4. The two grill plates 4a, 4b are then moved to their closed positions, as illustrated in FIG. 5 and retained in that position by latches 7a, 7b and locking knob 8.

During the grilling operation, oils and other fluids emanating from the food article being cooked drain via opening 20 in the food holder and drip onto pan 9c.

After the food article has been grilled, the two grill plates 4a, 4b are pivot to their open positions, as illustrated in FIG. 1, and the food holder, including the article of food 17 therein, is removed from the appliance. The food article may then be removed from the holder 10 and the holder disposed of.

It will thus be seen that the use of an appliance as described above, including a food holder 20 for holding the food article during is grilling, retains the two grill plates substantially clean, and thereby obviates the need for frequent cleaning. The drippings from the food article are received by pan 9c which may be separately removed and cleaned whenever desired.

Figure 3:
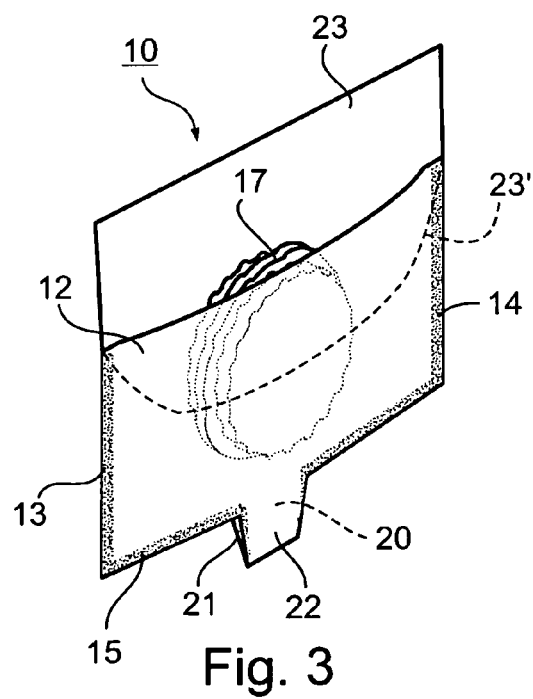
FIG. 3 illustrates a modification in the construction of the food holder of FIG. 2 wherein one panel is of larger width than the other panel to define a flap foldable over the other panel.

FIG. 3 illustrates a food holder similar to that illustrated in FIG. 2, and therefore the elements in FIG. 3 corresponding to those in FIG. 2 are identified by the same reference numerals. In FIG. 3, however, one of the panels, in this case panel 11, includes an extension 23 extending upwardly past the other panel at the large opening 18 to define a flap foldable over the other panel to close opening 18, as indicated in dotted lines by flap 23' in FIG. 3.

While the invention has been described with respect to two preferred embodiments, it will appreciated that many other variations, modifications and applications of the invention may be made.

What is claimed is:

1. A cooking appliance, comprising:
    a base for supporting the cooking appliance on a horizontal surface;
    two cooking plates each pivotally mounted on said base to various angular positions including a substantially vertical position wherein the two plates are disposed in a substantially parallel spaced relationship to each other for receiving between them a food article to be cooked, and with one of the edges of each plate, constituting the upper edge, located vertically above the edges at the opposite side of the respective plate, constituting the lower edges;
    said cooking plates being formed centrally of said lower edges with a ribbed formation defining a drain channel for draining from the plates fluids emanating from the food article during the cooking thereof between said plates.

2. The cooking appliance according to claim 1, wherein said cooking plates are grill plates for grilling a food article therebetween.

3. The cooking appliance according to claim 1, further including a disposable food holder of a flexible heat-resistant sheet material formed with a compartment for holding the food article during the cooking thereof between said cooking plates.

4. The cooking appliance according to claim 3, wherein said food holder includes a pair of flexible panels of heat-resistant material joined to each other at their side peripheral edges to define said compartment for holding the food article in a substantially vertical position during the heating thereof;
    the peripheral edges of the panels defining the top of the compartment, in the vertical position of the compartment, being non-joined to each other to define a large opening for introducing and removing the food article with respect to said compartment;
    the peripheral edges of the panels defining the bottom of the compartment, in the vertical position of the compartment, being joined to each other except for a small section in which the panels are non-joined to define a small drain opening aligned with said drain channel of the cooking plates for draining fluids emanating from the food article during the heating thereof in said compartment.

5. The cooking appliance according to claim 4, wherein at least one of said panels includes, at said non-joined section of the bottom of the compartment, an extension extending downwardly of said joined edges at said bottom and received in said drain channel such as to direct the fluids draining through said drain opening to a restricted dripping region underlying said drain opening.

6. The cooking appliance according to claim 5, further including a removable drip pan supported by said base under said drain opening.

7. The cooking appliance according to claim 5, wherein both of said panels include, at said non-joined section of the bottom of the compartment, an extension extending downwardly of said joined bottom edges and straddling said drain opening, such as to direct the fluids draining through said drain opening to said restricted dripping region underlying said drain opening.

8. The cooking appliance according to claim 7, wherein said extensions in said panels of the food holder are of a tapered configuration decreasing in width towards their outer edges.

9. The cooking appliance according to claim 7, wherein said non-joined section of the panels of the food holder defining said drain opening is located substantially centrally of said joined bottom edges of the panels.

10. The cooking appliance according to claim 7, wherein said panels are of a flexible, transparent, heat-resistant sheet material.

11. The cooking appliance according to claim 7, wherein at least one of said panels includes an extension extending upwardly past the other panel at said large opening to define a flap foldable over said other panel to close said large opening.

12. A food holder for holding a food article while being heated between heating plates in a cooking device, comprising:
    two panels of heat-resistant material joined to each other to define a compartment for holding a food article in a vertical position during heating thereof;
    said panels including top peripheral edges defining the top of the compartment, in the vertical position of the compartment, and non-joined to each other to define a large opening for introducing and removing the food article with respect to said compartment;
    said panels including bottom peripheral edges defining the bottom of the compartment, in the vertical position of the compartment, being joined to each other except for a small section in which the panels are non-joined to define a small drain opening for draining fluids emanating from the food article during heating thereof in said compartment;
    at least one of said panels including, at said non-joined section of the bottom of the compartment, an extension extending downwardly of said joined edges at said bottom such as to direct the fluids draining through said draining opening to a restricted dripping region underlying said drain opening.

13. The food holder according to claim 12, wherein both of said panels include, at said non-joined section of the bottom of the compartment, an extension extending downwardly of said joined bottom edges and straddling said drain opening, such as to direct the fluids draining through said drain opening to said restricted dripping region underlying said drain opening.

14. The food holder according to claim 13, wherein said extensions are of a tapered configuration decreasing in width towards their outer edges.

15. The food holder according to claim 12, wherein said non-joined section defining said drain opening is located substantially centrally of said joined bottom edges of the panels.

16. The food holder according to claim 12, wherein said panels are of a flexible, transparent, heat-resistant sheet material.

17. The food holder according to claim 12, wherein said panels are of a rectangular configuration.

18. The food holder according to claim 12, wherein at least one of said panels includes an extension extending upwardly past the other panel at said large opening to define a flap foldable over said other panel to close said large opening.

* * * * *